United States Patent

Thomas

[15] 3,703,724

[45] Nov. 21, 1972

[54] RECORDER WITH ZONE PLATE SCANNER

[72] Inventor: Carlton E. Thomas, Van Nuys, Calif.

[73] Assignee: KMS Industries, Inc., Ann Arbor, Mich.

[22] Filed: July 22, 1971

[21] Appl. No.: 165,020

[52] U.S. Cl..................346/108, 340/173 LM, 350/7, 350/162 ZP

[51] Int. Cl............................G11b 7/00, G02b 27/38

[58] Field of Search......346/108; 350/162 ZP, 3.5, 7; 340/173 LM, 173 LS, 173 LT; 178/7.6

[56] References Cited

UNITED STATES PATENTS

| | | | |
|---|---|---|---|
| 3,408,656 | 10/1968 | Lamberts | 346/108 X |
| 3,560,071 | 2/1971 | Silverman et al. | 350/3.5 |
| 3,614,193 | 10/1971 | Beiser | 350/162 ZP |
| 3,619,033 | 11/1971 | McMahon | 350/162 ZP |

*Primary Examiner*—Joseph W. Hartary
*Attorney*—Barnes, Kisselle, Raisch & Hoate

[57] ABSTRACT

A zone plate scanner for wide bandwidth laser recorders utilizing a rotating disc having pairs of peripheral windows, each containing a zone plate, one set of windows in each pair being spaced circumferentially at a constant radius, and a second set being similarly spaced circumferentially but each having a different radius. The spacing changes the grating frequency for each pair and encodes each track on a moving film in a manner which eliminates interference in close spacing and reduces the criticality of readout equipment.

5 Claims, 4 Drawing Figures

FIG. 2

PATENTED NOV 21 1972 3,703,724

SHEET 1 OF 2

INVENTOR
CARLTON E. THOMAS
BY
Barnes, Kisselle, Raisch & Choate
ATTORNEYS

INVENTOR
CARLTON E. THOMAS
BY
Barnes, Kisselle, Raisch & Choate
ATTORNEYS

RECORDER WITH ZONE PLATE SCANNER

Reference is made to a copending application of Carlton E. Thomas and Norman G. Massey, on a "-Method and Apparatus for Recording Intelligence on Sheet Material," Ser. No. 151,458, filed June 9, 1971.

This invention relates to an Apparatus for Recording Intelligence on a Sheet Material in such a manner that intelligence can be subject to readout at will.

It is an object of the present invention to improve on present type recorders by permitting higher bandwidths to be recorded with much lower mechanical tolerances and a much better signal-to-noise ratio.

It is an object of the invention to record and permit playback of very wide bandwidth, analog, or digital data on photosensitive film.

In this history of this art of recording, it has become known that a laser may be used to record information. The highly collimated laser beam can be focused to a small intense spot of light on film and this brightness in turn can be utilized to record on very high resolution, low sensitivity films, thereby achieving very high packing densities.

It is also possible to record very wide bandwidth signals which require short dwell times on each film resolution element. There have been difficulties, however, encountered in playback where film noise and tracking difficulties limit the performance. Devices are available for bandwidths up to 100 megahertz (MHz). The basic components of a conventional laser recorder have included a flat film with a laser beam which is swept across the film by a rotating polygon mirror with a light modulator interposed in the beam to add the intelligence which is to be recorded. There have been, however, limitations on these conventional recording systems. The bandwidth is limited by the rotation rate of the polygon mirror.

Other problems with the conventional laser recorders are noise and the readout tracking system. At low data rates, the fine lines on film can be tracked by a mechanical servo system driving a mirror. At megacycle rates, mechanical tracking has been difficult. Without a tracking loop, the mechanical tolerances on recording and playback are extremely tight. First of all, the polygon mirror faces must be accurate to seconds of arc or less to keep the tracks accurately spaced. Even the bearings supporting the mirror must have micro inches of runout and the film drive must be extremely uniform on playback as well as during recording.

In view of the above difficulties, it is an object of the present invention to provide an improved recording and playback method and system which will handle wide bandwidth, analog, or digital data to the extent of 400 MHz with much lower mechanical tolerances on the equipment used and a much better signal-to-noise ratio. Basically, this involves the concept of recording narrow gratings, that is, one dimensional holograms with infinite focal lengths, on the film instead of focused spots.

The concept further includes the changing of the spatial frequencies of these gratings for each scan line in sequence. Thus, due to the nature of the holographic information, the adjacent scan lines can overlap on the film without producing intolerable channel cross talk. However, due to the different grating frequencies, the different channels can be separated for readout. This virtually eliminates the tracking problem of previous devices inasmuch as a Fourier transformation is spatially invariant, and the location of the reconstructed light spots in readout is independent of the horizontal location of the gratings on the film. Thus, the system compensates for lateral displacement of the gratings during recording due to possible polygon mirror angular error or for erratic film motion.

A distinct advantage of the proposed system is that there is a considerable reduction in noise. Dust or scratches the size of a resolution spot will not destroy any particular bit of information.

It is thus an object of the invention to provide a superior recording and readout system which permits the use of less expensive equipment without detracting from the quality of the output.

It is a further object of the invention to avoid the necessity of rotating mirrors in a recording or read-out system since these elements in a system are very expensive and subject to centrifugal distortion due to the high speed rotation.

It is a further object to provide a system wherein centrifugal distortion can be anticipated and compensated for in initial design.

A further object is a recording system which can be housed much more compactly and which is not limited by depth of field and off-axis aberrations of the recording lens.

Other objects and features of the invention will be apparent in the following description and claims in which the principles of operation are set forth together with the best mode presently contemplated for the practice of the invention.

Drawings accompany the disclosure and the various views thereof may be briefly described as:

Previous laser recorders have utilized a stationary collimated laser beam which is intensity modulated with the signal being recorded. A spinning mirror and a recording lens have converted the beam into a focused spot which travels across the photographic film. The present invention improves on previous devices by replacing the two components with a single zone plate scanner. Reference is made here to an article by Ivan Cindrich on "Image Scanning by Rotation of a Hologram" published in APPLIED OPTICS, September 1967, Vol. 6, No. 9, Page 1531.

Figures 1, 2:
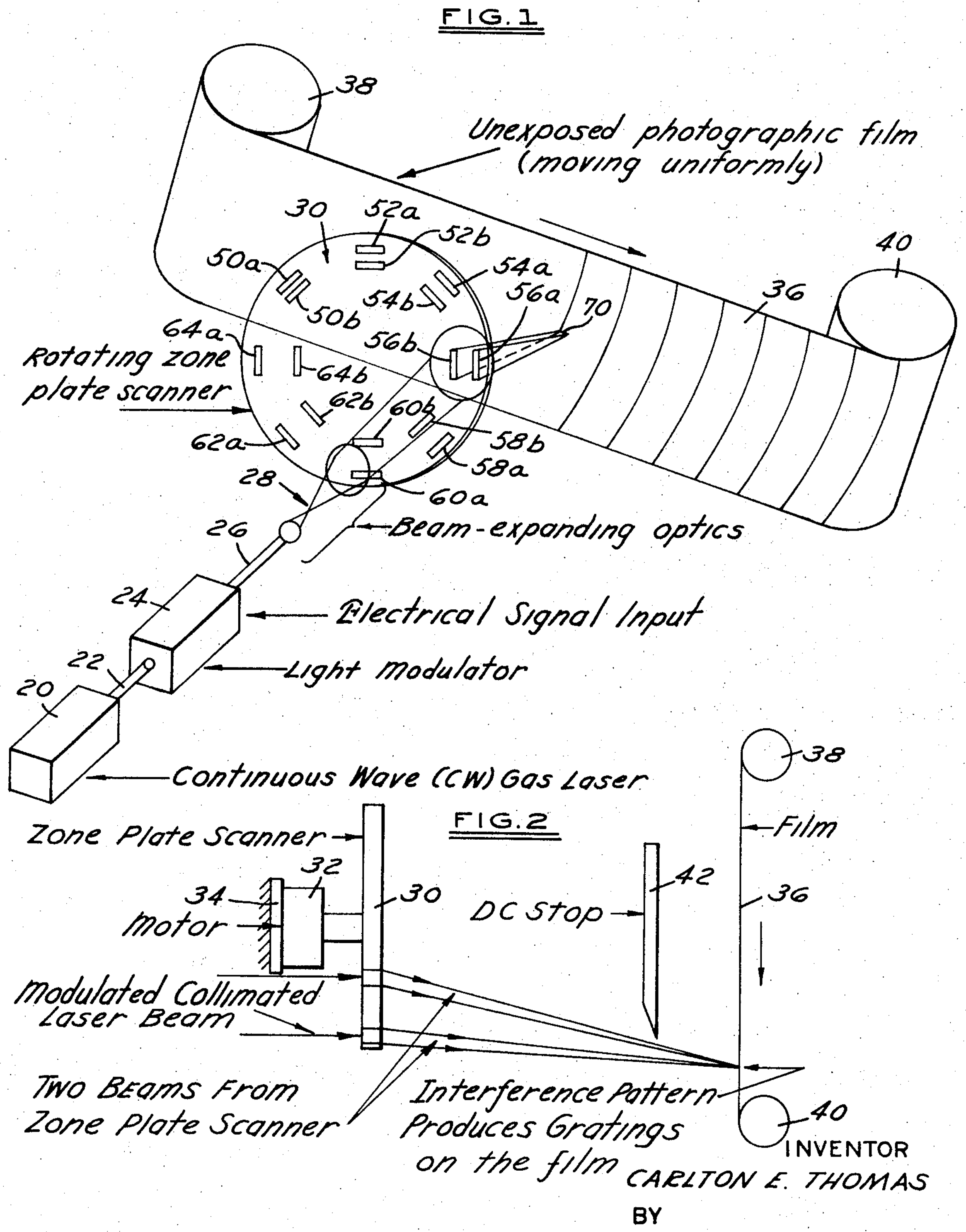
FIG. 1 is a schematic view of an apparatus for accomplishing the invention.
FIG. 2 is a side view showing portions of the apparatus in operative relationship.

The basis system of the present invention is illustrated in FIG. 1 in a schematic presentation wherein a continuous wave gas laser source 20 directs a beam 22 to a light modulator 24 which will receive a signal input to impart data to the beam in the usual manner. The modulated beam 26 passes to beam expanding optics 28 and thence in a collimated beam to a rotatably mounted plate 30 driven by a constant speed motor 32 (FIG. 2). The motor is mounted on a bracket plate 34. The plate may also be edge mounted and rotated. Behind the plate 30 is the recording strip of sheet material 36 which will move in customary fashion at a uniform speed behind the plate with suitable feed-out and feed-in rolls 38 and 40.

The plate 30, which may be referred to as a zone plate scanner, is a flat disc which contains a plurality of Fresnel zone plates which may be referred to as openings or windows in the otherwise opaque disc. These zone plates can be created by recording them on an ordinary photographic emulsion and each zone plate acts like a lens which focuses the laser beam at the film plane. By rotating the disc or plate 30, the focused beam will move across the film as desired. Thus, the zone plate scanner acts like a set of moving lenses and eliminates the need for a spinning mirror and a recording lens.

A zone plate will, of course, in addition to generating a focused area, also produce a virtual beam and an undiffracted DC beam. As shown in FIG. 2, a physical stop 42 is placed between the scanner and the film to block these desired beams which would overexpose the film. With the use of a single beam zone plate scanner, the speed of the film would have to be such that the tracks were clearly delineated to make it possible for proper readout. The single track recording, however, requires accurate tracking in readout and diminishes the amount of material that can be held on a particular film.

It is thus highly desirable that the playback problem be solved by recording one-dimensional holograms or gratings instead of the focused spots of light. Thus, by utilizing differing spatial frequencies on adjacent tracks, the overlap problem is eliminated and the film can carry much more data with less critical readout equipment.

The zone plate scanner makes it possible to accomplish this holographic recording without additional beams or equipment. This is done by providing double zone plates for each recorded line on the film whereby one-dimensional holograms or gratings are recorded at varying spatial frequencies. The hologram on the plate is masked down to provide two spaced zone plates in each of a plurality of segments.

Thus, each segment has a pair of zone plates as shown in FIG. 1 shaped as narrow rectangles 50, 52, 54, 56, 58, 60, 62, 64. When illuminated by the coherent laser light, each holographic rectangle regenerates the horizontal line of light 70 on the film which is orthogonal to the recorder track arc. It will be noted that the rectangles are vertical in FIG. 1 at the area of beam intercept. These two lines of light interfere at the plane of the film, thereby generating a grating having a particular spatial frequency dependent on the particular radial spacing of the holographic rectangles. Each segment of the disc has the rectangles spaced differently in radial dimension and thus, for each scan, the grating frequency will be different and the tracks can be close together without causing disturbing interference in readout.

In the particular embodiment shown in FIG. 1, the radial variance has been accomplished by having each outside rectangle **50*a* to 64*a* of each pair at a constant radial distance from the axis of rotation. The inner rectangles 50*b* etc. are located at varying radii progressively increasing in the eight segments to 64*b***. Other spacing could be arranged to accomplish the variation which produces a different spatial frequency for each particular segment.

The zone plate scanner is less susceptible to distortions caused by centrifugal force than a bulky spinning mirror. The forces will all be radial. The net shift in radial position of each zone plate at high rotation speeds will have no effect on recorder performance. In theory, radial distortion within the zone plate area can degrade the resolution of the focused spot. It can be shown, however, that the resolution or smallest zone of a zone plate is equal to the diffraction-limited laser beam spot on the film. Thus, for 100 lines per millimeter resolution on the film, the last zone on the zone plate must have a five micron spacing, or about ten wavelengths of light. Distortions must be small compared to ten wavelengths of light. The spinning mirror, however, must not distort the reflected wavefront by more than a small part of the wavelength of light. On this basis, the zone plate scanner will be ten times less sensitive than a spinning mirror to centrifugal force degradation.

Furthermore, since the scanner is a planar disc, techniques to compensate for centrifugal force should be much easier. For example, one could calculate the effects of zone plate radial distortion, and generate a predistorted zone plate pattern which would assume the correct pattern at operating rotational speeds. The same compensation of three-dimensional spinning mirrors would be extremely difficult, both to calculate and to manufacture.

Figures 3, 4:
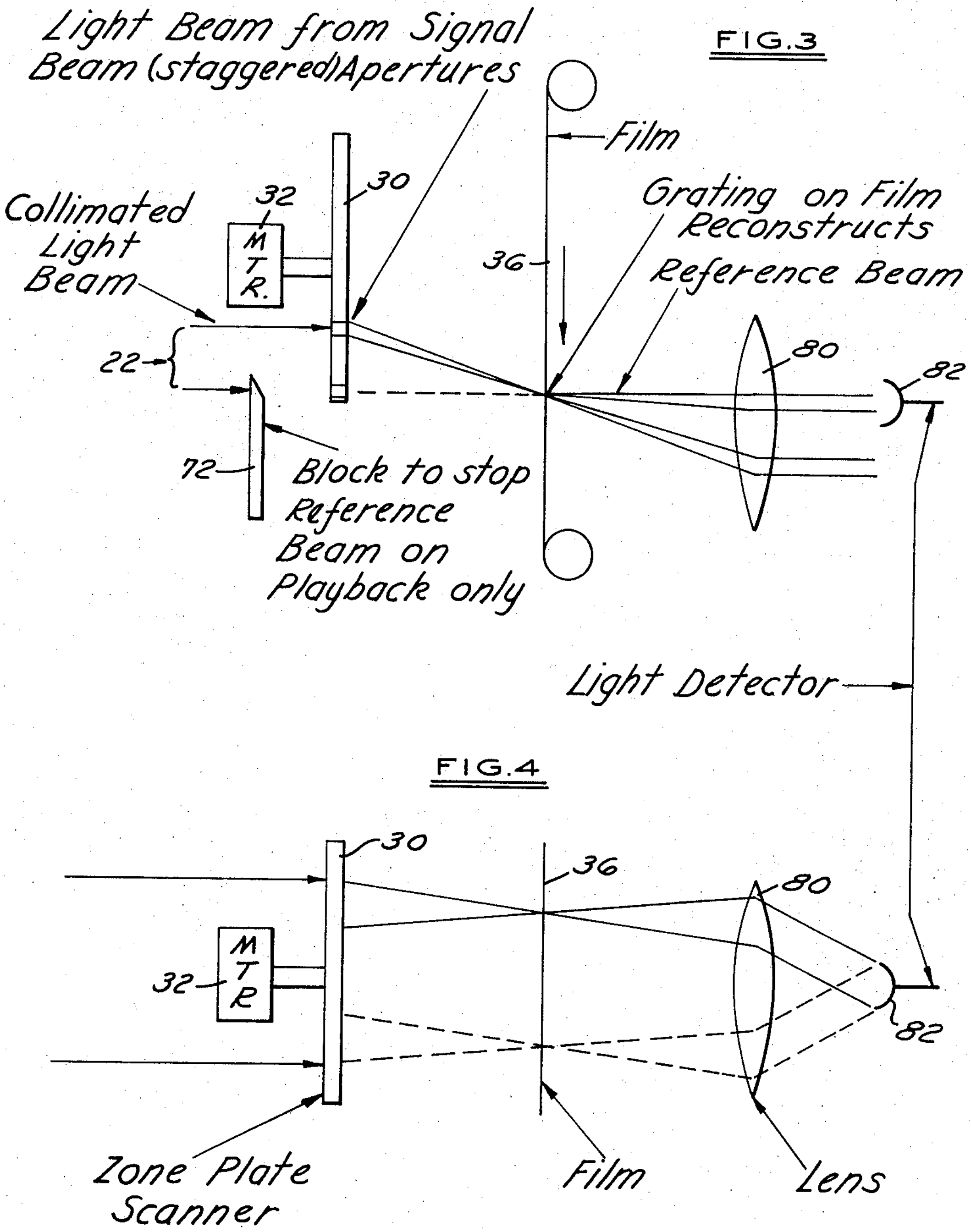
FIG. 3 is a top view of a readout system for the recorded information.
FIG. 4 is a side view of a readout system illustrated in FIG. 3.

On playback, as illustrated in FIG. 3, the zone plate scanner 30 is rotated as before in the beam 22 of collimated coherent light. The illumination of the constant radius rectangles **50*a* to 64*a* is blocked by a shield 72. The gratings 50*b* to 64*b* will generate a spot of light which moves along a short arc in the Fourier transform plane of the readout lens 80. The radii of the arcs from adjacent tracks will differ and the readout detector 82 must, therefore, integrate the light energy along an arc of a fixed radius from the optical axis. FIG. 4** shows a side view of the readout system.

Thus, there is provided a zone plate scanner of simple construction and inexpensive design which is far less susceptible to centrifugal force distortions than the spinning mirror design, and, if this distortion is a factor in any particular application, the place scanner is amenable to advance correction on the applied gratings. It will be noted that there are no precision optics needed in the system. In addition, the space required to house the unit is much less than that required for previous devices. Not only is the bulky equipment eliminated, but it is calculated that for 100 l/mm resolution on the film and a six inch spacing between the on-axis scanner and the film, the scanner disc diameter need only be about 0.93 inch for a light wavelength of 6328A (Helium Neon Laser) or 0.72 inch at 4880A (Argon laser).

The device is not limited by depth of field and off-axis aberrations of the recording lens and accordingly a higher resolution will permit lower scanning speeds, higher packing densities or higher bandwidths.

The above-described zone plate scanner will also permit the generation of relatively simple holographic laser recorders since the zone plate doublets can be generated holographically and perfect registration of the two laser lines is virtually assured since the lines are generated holographically from the same physical line of light. The zone plate scanners may also be duplicated by high resolution copying techniques to enable information recorded on one system to be played back by a different system.

I claim:

1. In a system for recording data on a light sensitive recording medium utilizing a coherent light source, a sheet of light sensitive recording medium, and means for moving the sheet in the direction of its plane, that improvement which comprises:

a. a plate to receive data-modulated light from said source as the light moves toward said sheet,
b. means for mounting said plate for rotation about an axis perpendicular to the plate,
c. means forming a series of spaced pairs of zone plate apertures on said plate arranged circumferentially around said axis, one aperture of each pair being disposed at a constant radius relative to said axis and the other aperture of each pair being disposed at differing radii relative to said axis,
whereby light passing through each pair of apertures to said sheet will record as a different grating frequency.

2. In a system for recording data on a light sensitive recording medium utilizing a coherent light source, a sheet of light sensitive recording medium, and means for moving the sheet in the direction of its plane, that improvement which comprises:

a. a plate to receive data-modulated light from said source as the light moves toward said sheet,
b. means for mounting said plate for rotation about an axis perpendicular to the plate, and
c. means forming a series of spaced pairs of zone plate apertures on said plate arranged circumferentially around said axis, said apertures of each pair being spaced relative to each other and to said axis with respect to other apertures in the series whereby coherent light passing through each pair will record on said sheet at a different grating frequency.

3. In an apparatus for recording intelligence on a moving sheet carrying light sensitive material in the form of light modulated interfering beams carrying informational data, that improvement which comprises a rotating plate positioned to have a peripheral portion interposed in a light modulated beam directed at said moving sheet, said peripheral portion having a plurality of pairs of circumferentially spaced zone plate apertures, the apertures of each pair being disposed radially to create interfering beams having a different grating frequency from any other pair wherein closely spaced encoded data can be recorded on said moving sheet for eventual readout.

4. In a system for recording data on a light sensitive recording medium utilizing a coherent light source, a sheet of light sensitive recording medium, and means for moving the sheet in the direction of its plane, that improvement which comprises:

a. a plate to receive data-modulated light from said source as the light moves toward said sheet,
b. means for mounting said plate in a plane between said source and said sheet for motion in a direction generally transverse to the motion of said sheet, and
c. means forming a series of spaced pairs of light transmitting zone plate areas on said plate arranged sequentially along said plate, said areas of each pair being spaced relative to each other and to said other areas in the series whereby coherent light passing through each pair will record on said sheet at a different grating frequency as said plate moves relative to said strip.

5. In a system for recording data on a light sensitive recording medium utilizing a coherent light source, a strip of light sensitive recording medium, and means for moving the strip in a plane in the direction of its axial dimension, that improvement which comprises:

a. a plate interposed to receive data-modulated light from said source as the light moves toward said strip,
b. means for mounting and moving said plate in a plane between said source and said strip wherein portions of said moving plate overlie a portion of said strip to block passage of light to said strip, and
c. means forming a series of spaced pairs of light transmitting zone plate areas on said plate arranged sequentially along said plate, said areas of each pair being spaced relative to each other and to said other areas in the series wherein coherent light passing through each pair will sweep said strip transversely of its direction of movement at a different grating frequency as said plate moves relative to said strip.

* * * * *